Dec. 13, 1966  B. P. KUNKA ET AL  3,291,037
END ROLL STRAPPING APPARATUS
Filed Oct. 20, 1964  8 Sheets-Sheet 1

Inventors
Paul W. Fawcett
Bernard P. Kunka
By William P. Porcelli
Atty.

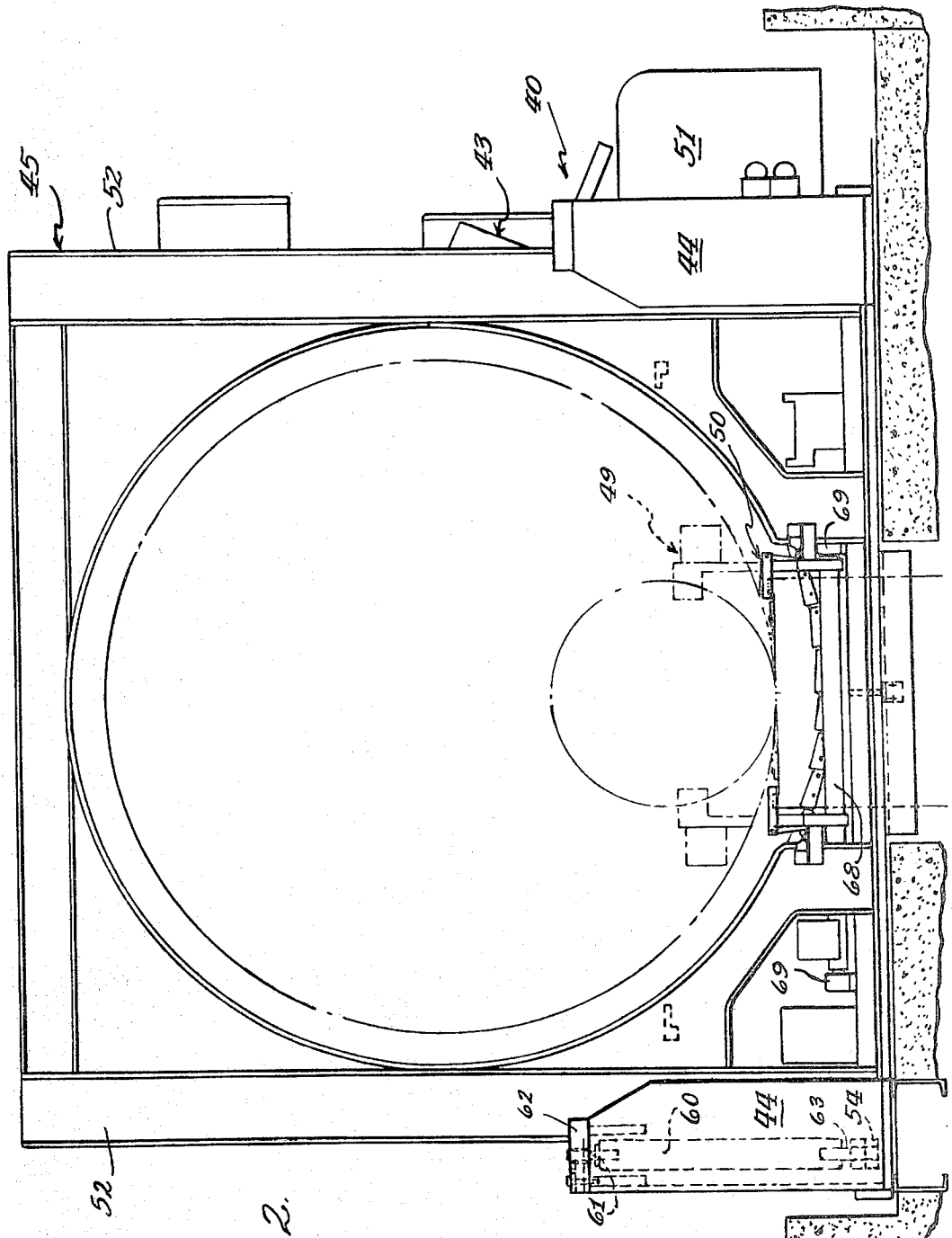

Dec. 13, 1966  B. P. KUNKA ET AL  3,291,037
END ROLL STRAPPING APPARATUS
Filed Oct. 20, 1964  8 Sheets-Sheet 3
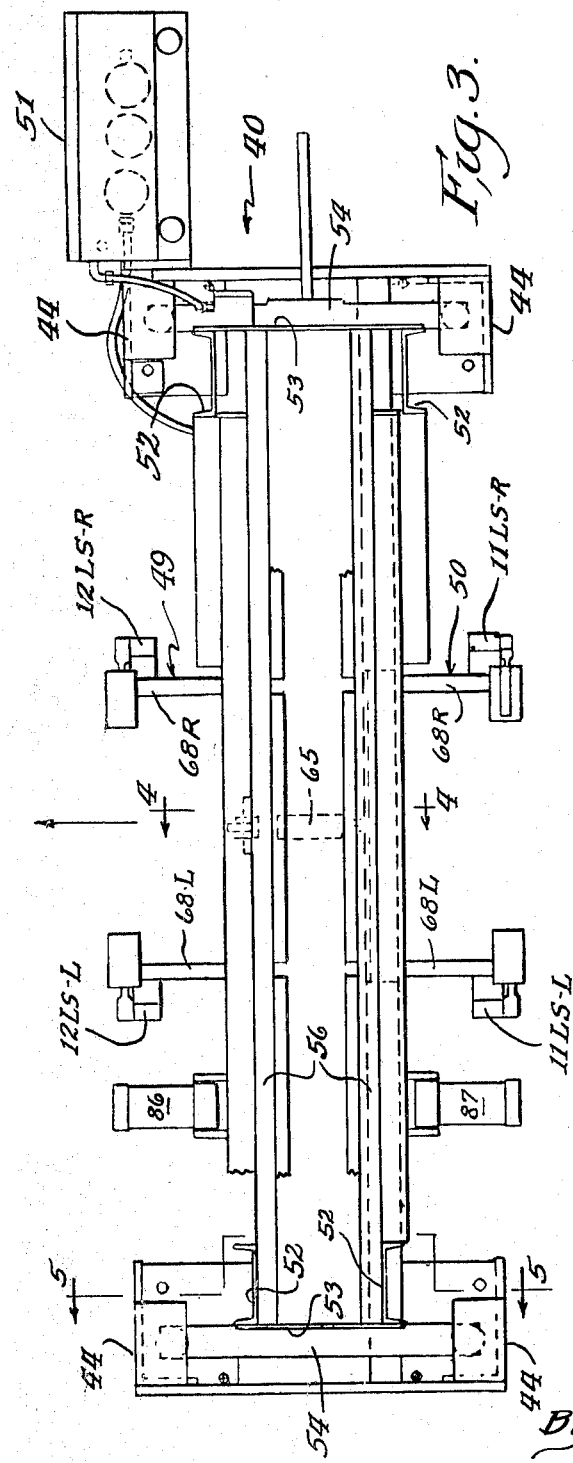
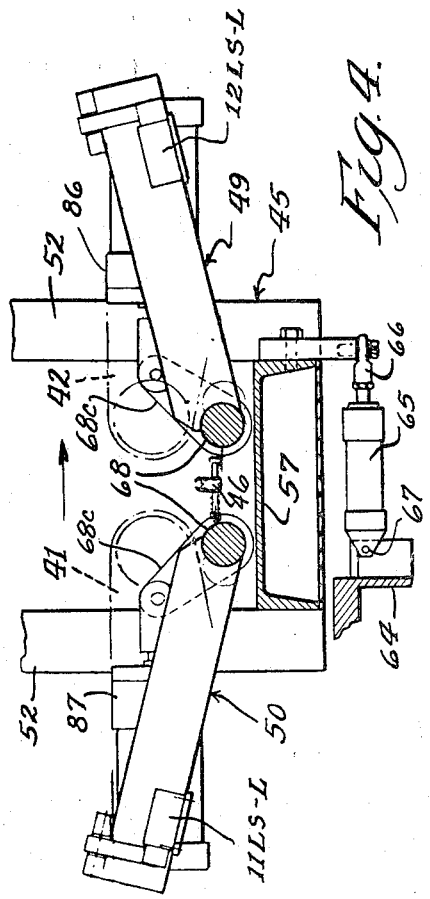
Inventors
Paul W. Fawcett
Bernard P. Kunka
By
Atty.

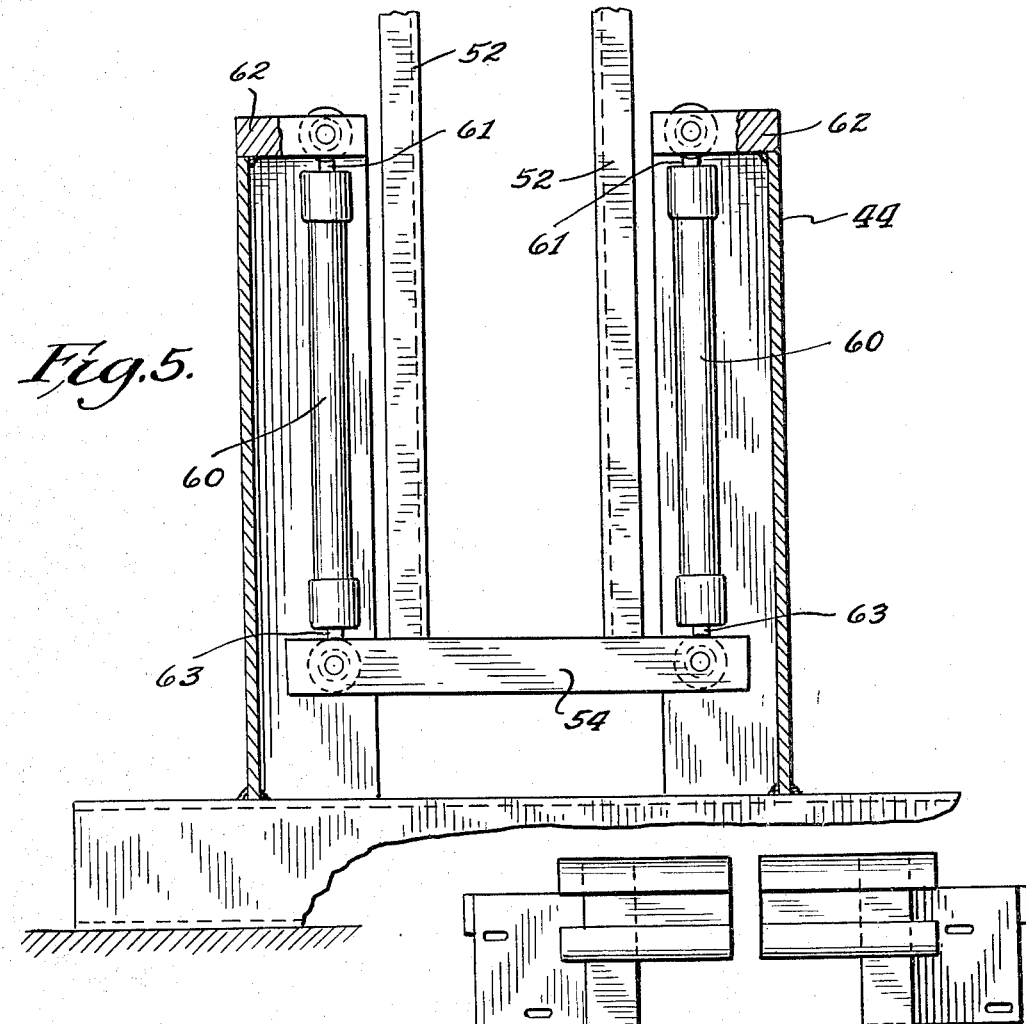
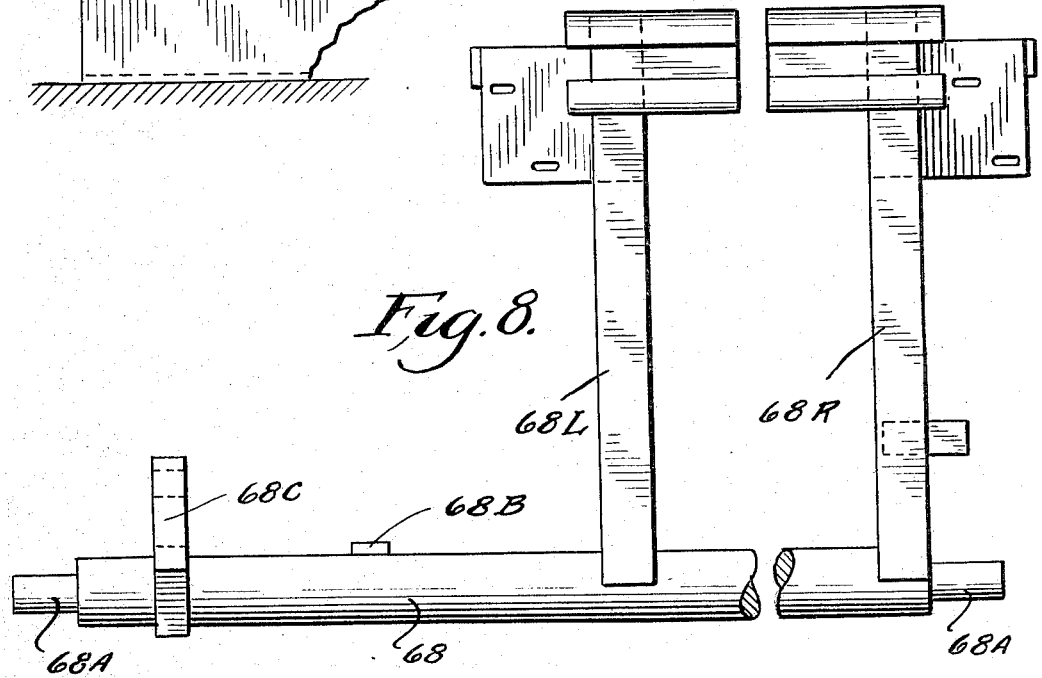

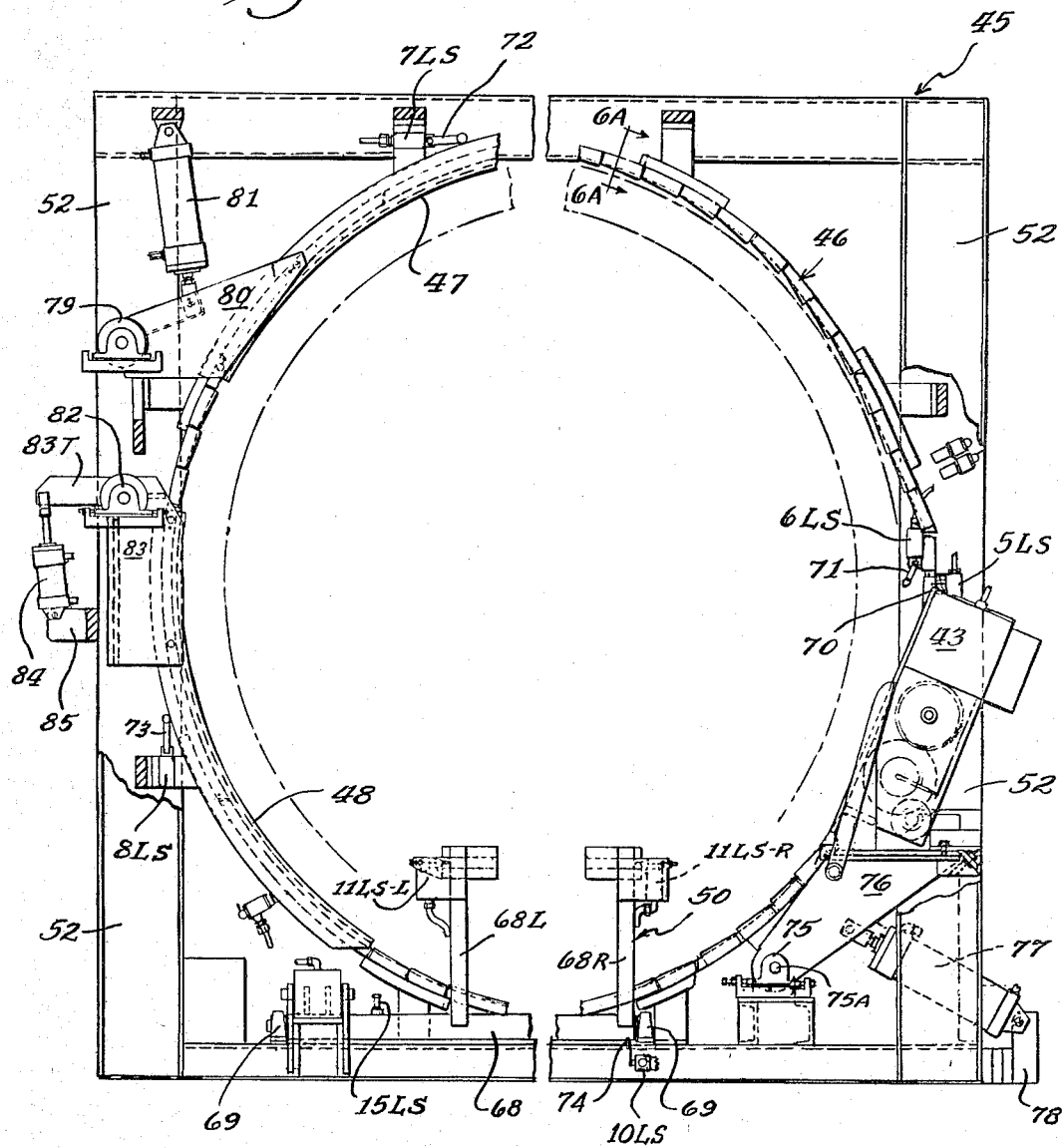

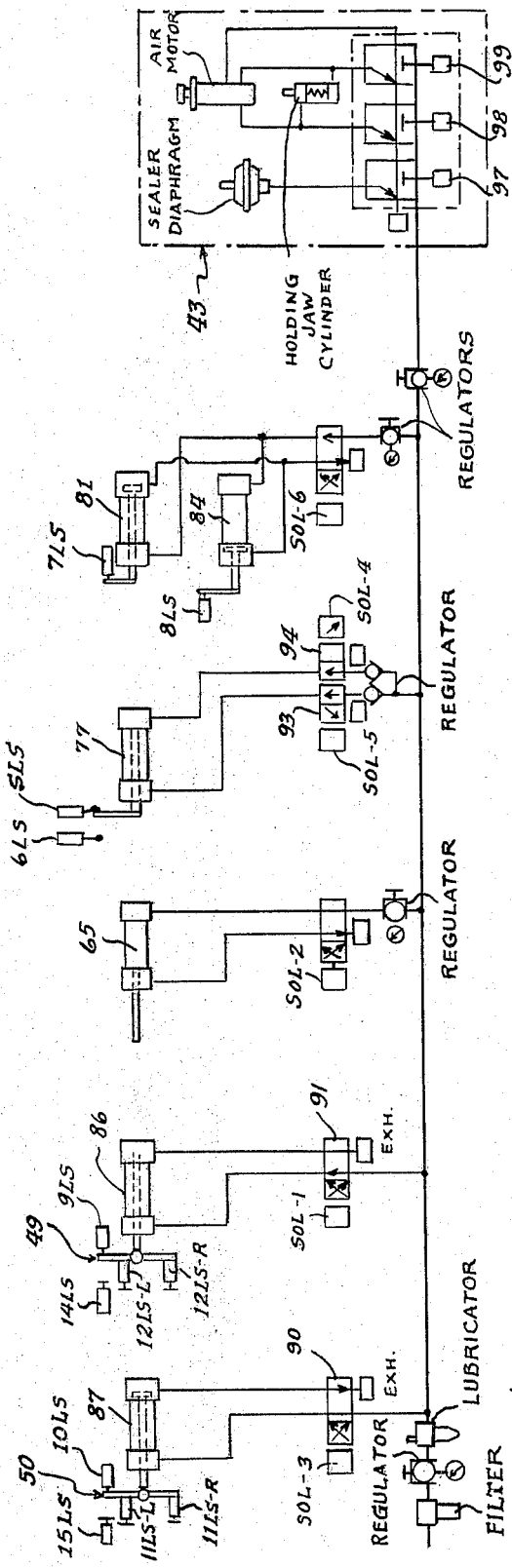

United States Patent Office 3,291,037
Patented Dec. 13, 1966

3,291,037
END ROLL STRAPPING APPARATUS
Bernard P. Kunka, Chicago Heights, and Paul W. Fawcett, Western Springs, Ill., assignors to Interlake Steel Corporation, a corporation of New York
Filed Oct. 20, 1964, Ser. No. 405,182
14 Claims. (Cl. 100—4)

This invention relates to strapping apparatus for applying a band about rolls of paper or similar articles and more particularly is concerned with providing a strapping ararngement that is floatingly mounted to establish a predetermined relation to the article to be strapped for insuring uniform and accurate positioning of the band.

In the case of rolls of paper, it is common practice to apply a band about each end of the roll to facilitate storage, handling and transportation of the roll. It is desirable to locate each band as close to the roll end as practical to preserve the bulk of the roll material against damage or detrioration.

Since the rolls are usually several feet in diameter they are transported on conveyors to a strapping station and it is difficult to regulate the conveyors for achieving exact registry of the roll ends with the strapping machine. Moreover, the endwise alignment of the roll as it rests on the conveyor is difficult to insure and this results in an undesirable and wasteful out-of-square relationship of the band as finally applied to the roll.

Accordingly, the principal object of the invention is to provide a strapping arrangement that may be moved relative to the roll to compensate for inaccuracies and variations in the roll end positioning.

Another object of the invention is the provision of a strapping ararngement having a floating frame equipped with roll end locating devices and movable to establish a predetermined relation of the frame about a roll in accordance with engagement of the locator devices against the roll end.

A further object of the invention is the provision of roll end strapping equipment employing a multidirectionally shiftable floating frame that is conveniently suited to use with a conventional unidirectional roll conveyor arrangement.

Still another object of the invention is the provision of an automatic strapping installation wherein roll position is sensed to control start and stop of conventional unidirectional roll conveyors and wherein a floating frame is automatically positioned in predetermined relation about a stationary roll by sensing equipment carried on the frame and responsive to the position of the roll end.

A general object of the invention is the provision of improved roll end strapping apparatus capable of applying a band in uniformly close relation at the end of a roll and capable of fully automatic operation as desired.

Other objects and advantages of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIGURE 2 is a generalized elevational downstream view of the strapping station;

FIGURE 3 is a generalized plan view of the strapping station;

FIGURE 4 is a fragmentary sectional view taken on the line 4—4 of FIGURE 3, illustrating the lower regions of the floating frame and roll end locating devices employed in the preferred practice of the present invention;

FIGURE 5 is a fragmentary sectional view taken as indicated on the line 5—5 of FIGURE 3 and illustrating the suspension link mounting arrangement for the floating frame;

FIGURE 6 is an elevational view, partly in section and with midwidth regions omitted, illustrating the mounting position of certain sensing and actuating elements located on the floating frame for performing various and banding functions in proper sequence;

FIGURE 6A is a detail sectional view illustrating the type of band guide track that is employed;

FIGURE 8 is an elevational view of a roll end locator device and appears on the same sheet with FIGURE 5;

FIGURE 10 is a schematic diagram of the pneumatic and electrical system for sequencing the operation of the air cylinder actuating devices that are mounted on the floating frame.

Figure 1:
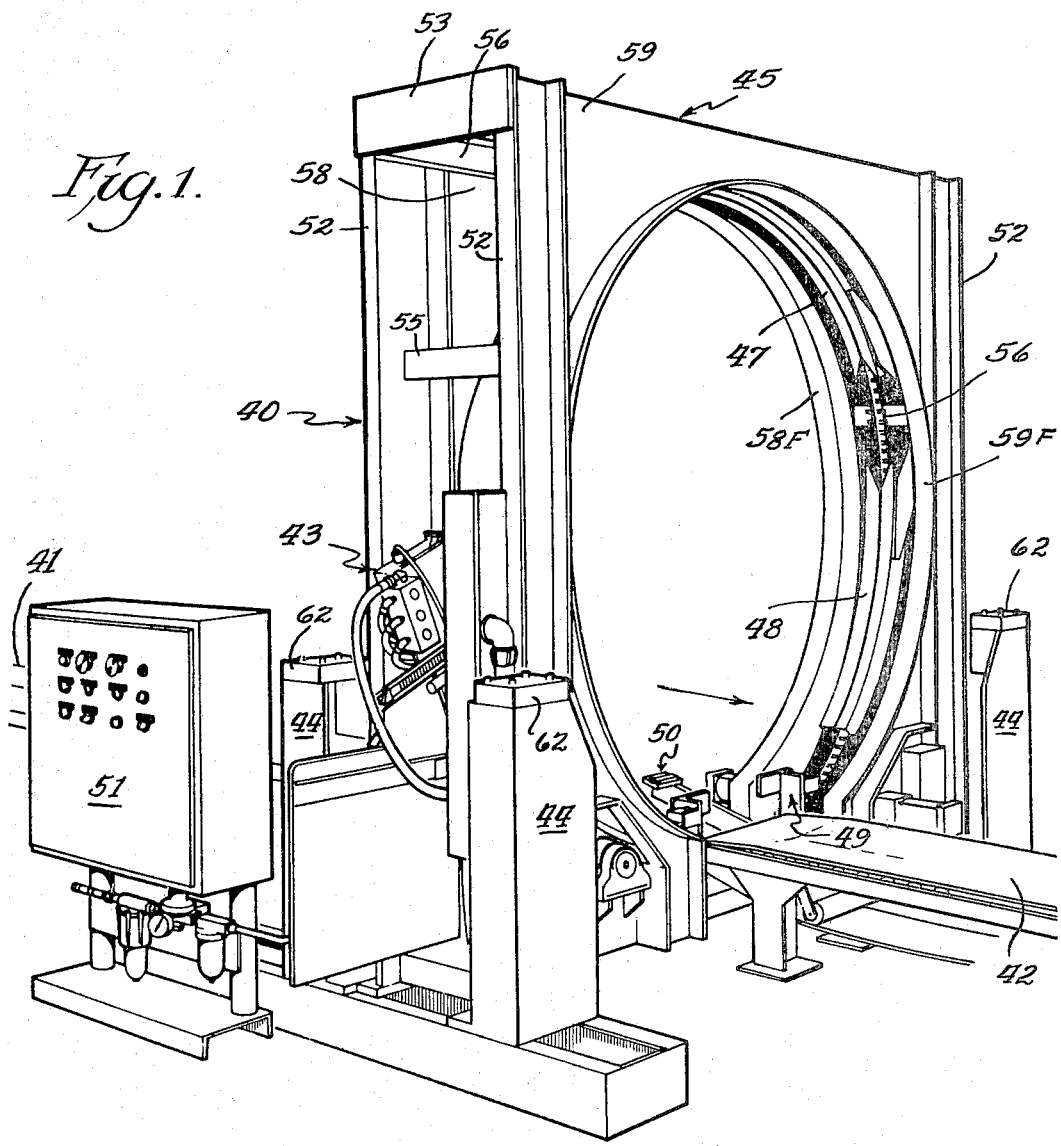
FIGURE 1 is a generalized perspective view illustrating an entire roll banding installation constructed in accordance with this invention and arranged for automatically applying a band at each end of each paper roll as a series of such rolls are conveyed to and through the equipment.

Referring now to the drawings, the entire installation, including the conveyors and the strapping machine, is shown in FIGURE 1 for purposes of illustrative disclosure. The installation is intended primarily for use in applying bands adjacent to the forward and trailing ends of paper rolls of any length and the strapping machine is itself adaptable to handling rolls of various diameters. While paper rolls of cylindrical form are usually contemplated, it will be apparent that other shapes can be handled and the principles of the invention may be applied to other articles. For convenience in terminology, the term "roll" is used exclusively herein and should be understood to include any of the various types of articles that the machine is capable of handling. The apparatus as pictured in FIGURES 1 to 3 includes a centrally located strapping station 40 interposed between infeed and discharge conveyors 41 and 42, respectively. The strapping station 40 receives a roll oriented substantially endwise as it is supplied from the infeed conveyor 41 to a position for the application of a band about the forward end of the roll. Thereafter, the discharge conveyor 42 operates in conjunction with the infeed conveyor 41 to advance the roll through the strapping station 40 until its trailing end is at a position for application of a separate band about the trailing end of the roll. The discharge conveyor 42 then delivers the banded roll while the infeed conveyor 41 supplies another roll to be strapped in the same fashion. Thus, in the ararngement illustrated herein, the infeed conveyor 41 and the discharge conveyor 42 are both started at the same time and are both stopped at the same time.

The strapping station 40 includes a strapping machine, the principal functions and details of which are well known in this art and therefore only the principal components of this machine and their general mode of operation are described specifically herein. It is sufficient for present purposes to indicate that such a machine may include a strapping head 43 of the type shown in Hall et al. Patent No. 3,139,813.

This type of strapping head includes facilities that are automatically operable for first drawing strap from a storage reel and feeding the strap around a guide track 46 until a large closed loop band is formed about the roll. Thereafter, the strapping head is operable to tighten and tension the band about the roll with the band ends overlapped. A seal clip is then applied and the strap is severed.

In accordance with one of the features of the present invention, the strapping station 40 has stationary support structure that includes a set of four upstanding hollow corner posts 44, a floating frame 45 suspended from the corner posts to undergo limited multidirectional movement in compensating for variations in the endwise position and orientation of each roll which is to be strapped. The floating frame 45 is equipped with a loop shaped band guide track 46 that has upper and lower band guides 47 and 48, respectively, which in conjunction with the band feeding, takeup, and sealing facilities of the frame mounted strapping head 43 constitutes a strapping machine floatingly mounted at the strapping station. The band guide track 46 as best shown in FIGURES 6 and 6A and indicated in FIGURE 4 may be of a type that has segmented side plates 46P normally biased together by springs 46S and yieldable separably to enable release of the band B during the tensioning cycle.

It may be noted that the conveyors 41 and 42 are required only for transporting the rolls in succession and are controlled to stop only within an approximate range, with the final accurate alignment and spacing relationship of the guide track 46 of the strapping machine to each roll end being achieved by final positioning of the floating frame with respect to the roll after the roll has stopped at the strapping station. For this purpose the floating frame 45 is equipped with a discharge side locator device 49 which is engageable with the forward end face of a roll and is equipped with an infeed or receiving side locator device 50 which is engageable with the trailing end face of a roll, each locator device being effective to regulate movement of the floating frame to orient the floating frame in a prescribed accurate relationship with respect to the corresponding roll end.

Figure 9:
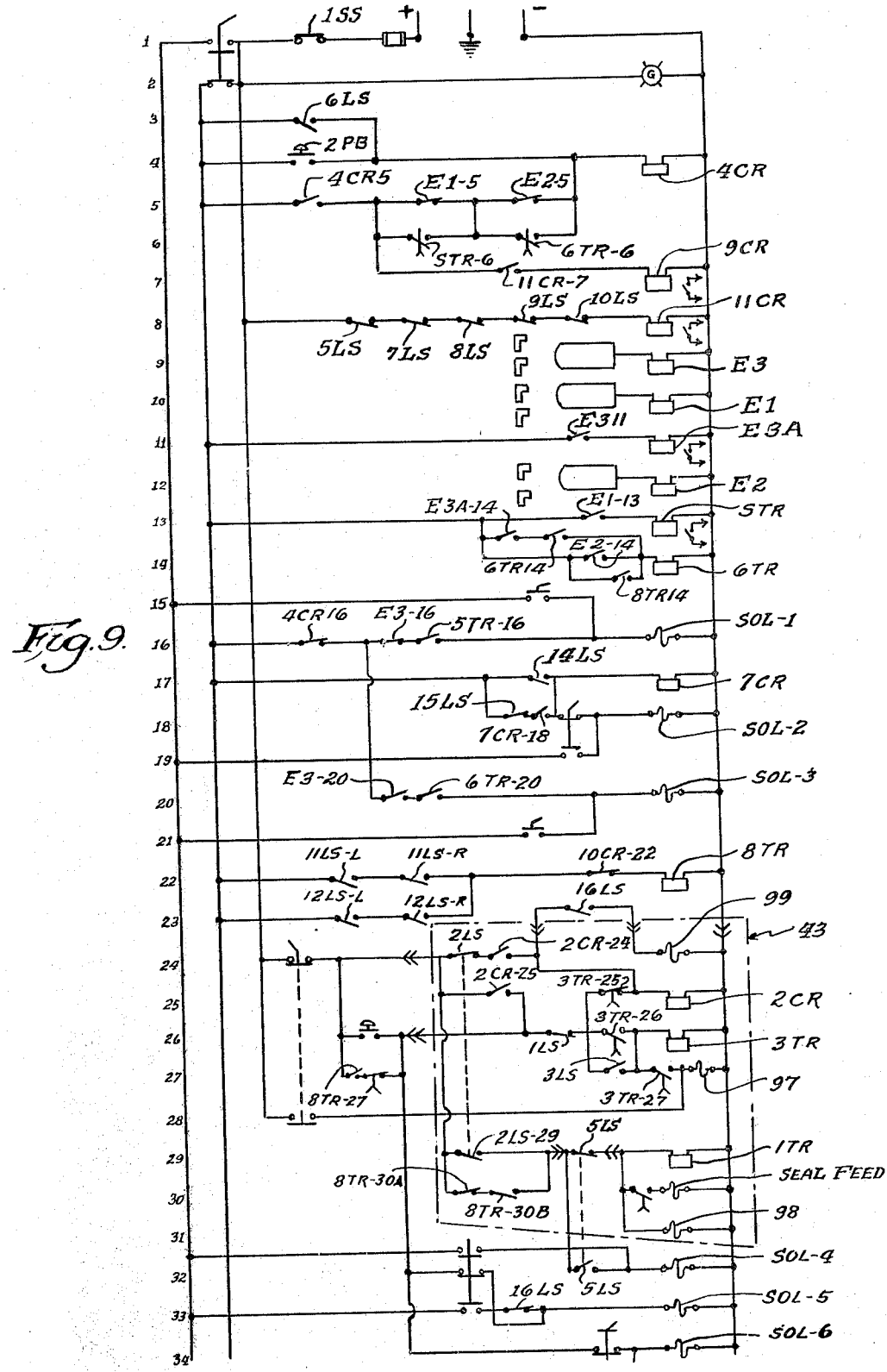
FIGURE 9 is a wiring diagram for the control circuit utilized in the preferred practice of this invention.

In FIGURES 1, 2 and 3 a control console 51 is shown at the strapping station 40 located alongside the support posts 44, and it includes much of the circuitry shown in the wiring diagram of FIGURE 9 and it includes connections to various sensing and control elements carried with the floating frame and also includes control circuit connections for regulating starting and stopping of the conveyors.

The floating frame has rigid side frame sections each consisting of fore and aft spaced vertical channels 52 interconnected at the top by a brace plate 53 and at the bottom by a brace beam 54 and by one or more intermediate braces 55. These side frame sections are in turn rigidly interconnected by top cross channels 56, a bottom cross channel 57, and by fore and aft spaced apertured main plates 58 and 59, respectively, which are provided with edge flanges 58F and 59F defining the opening through which the roll is conveyed. The band guide track 46 is mounted in the space between the plates 58 and 59. The upper and lower band guides 47 and 48 are located between the plates to extend along the track 46 when in retracted position and are movable toward the periphery of the roll to facilitate and regulate the band take-up action of the strapping head 43 which is also located between the plates 58 and 59 and movable toward the periphery of the roll to effect the strap take-up, tensioning, and sealing.

The suspension system for the floating frame as best shown in FIGURE 5 includes at each side a pair of vertical links 60 located outboard and spaced in fore and aft relation to the frame. Each link 60 has an upper rod end bearing 61 mounted from a fixed support head 62 provided on top of the corresponding support post 44 and a lower rod end bearing 63 connected to the extremity of the lower cross brace 54 of the floating frame. The support structure, in addition to the posts 44, includes a bottom cross brace 64 (FIGURE 4) and an air cylinder 65 is mounted beneath the floating frame 45 with one end connected in swivelled relation to the cross channel 57 of the floating frame through a rod end bearing 66, and the other end connected to the cross brace 64 through a bearing 67 to impart movement to the floating frame, with such movement being regulated by one of the locator devices in accordance with its engagement with the corresponding roll end. This suspension system allows universal swivelling movement about each bearing to enable the frame to undergo substantially endwise movement and limited tilting movement about a vertical axis sufficient to permit the frame to orient itself in a square relationship with respect to the roll end.

Each of the locator devices is similar, and as shown in FIGURE 8, includes a one-piece shaft 68 having stub axles 68A at its opposite ends and journalled in pillow block bearings 69 fixedly mounted on the floating frame. A pair of arms 68L and 68R are rigid with the shaft 68 and extend from the shaft in a common radial plane at locations alongside the travel path of the conveyors 41 and 42. The locator arms 68L and 68R therefore move as a unit and where the roll is out of alignment, first one locator arm will engage the roll end face and, upon continued movement of the floating frame, will cause a tilting of the frame about a vertical axis until the companion arm also establishes flush engagement with the roll end face. The maximum size of rolls which may be handled in the machine is limited by the size of the apertures in the main plates 58 and 59 of the floating frame and the minimum size is limited by the spacing between the contact faces of the locator arms 68L and 68R.

Each of the locator devices 49 and 50 is arranged to be pivoted from a lower retracted position such as is illustrated for the upstream device 50 in FIGURES 1 and 2 to an upper extended position such as is illustrated for the downstream device 49 in FIGURES 1 and 2. In FIGURES 3 and 4 both devices are shown retracted.

A number of limit switches are associated with the various operating elements for sensing their position and controlling related equipment in a prescribed sequence and the switch mounting locations are shown in FIGURE 6. Thus, limit switches 5LS and 6LS are mounted at mid-height regions on the right hand side of the floating frame as viewed in FIGURE 6, and each has a sense arm engageable with upper regions of the strapper head unit 43. Switch 5LS has its sense arm 70 held operated while the strapper head unit is at its retracted position as represented in full lines in FIGURE 6. Switch 6LS has its sense arm 71 in the arcuate travel path of the upper region of the strapper head unit 43 to be operated momentarily by the strapper head unit as it returns to its retracted position. Limit switch 7LS is located adjacent the top central region of FIGURE 6 and is mounted on the frame with its sense arm 72 positioned to be engaged and held operated when the upper band guide 47 is in its retracted position, as illustrated in full lines in FIGURE 6. Correspondingly, switch 8LS is mounted along the lower left region of the floating frame and it has its sense arm 73 arranged to be held operated by the lower band guide 48 when it is in its retracted position.

A limit switch 10LS is mounted on the lower cross beam structure 57 of the floating frame and is provided with a sense arm 74 which is held operated when the upstream locator device 49 is at its lower retracted position. A corresponding limit switch 9LS is mounted on the opposite side of the cross beam structure 57 of the floating frame and is associated with the downstream located device 50, and while switch 9LS does not appear in FIGURE 6, it is included in the wiring diagram of FIGURE 9. Each of the arms 68L and 68R of the upstream locator device 50 is provided with limit switches 11LS-L and 11LS-R, which are activated only upon the contact face of such arm engaging the roll end, these limit switches being connected in series relation so that both must be actuated before the actual strapping cycle may begin. Similar limit switches 12LS-L and 12LS-R are associated with the arms 68L and 68R of the downstream locator device 49 and are shown only in the wiring diagram of FIGURE 9.

In FIGURE 6 there is also shown a limit switch 15LS which is operated only when the upstream locator device is up. The shaft of the locator device, as shown in FIGURE 8, is provided with a stub lever 68B for actuating limit switch 15LS. A similar limit switch 14LS is associated with the downstream locator device to be operated when it is up by means of a similar stub lever (not shown).

Figure 7:
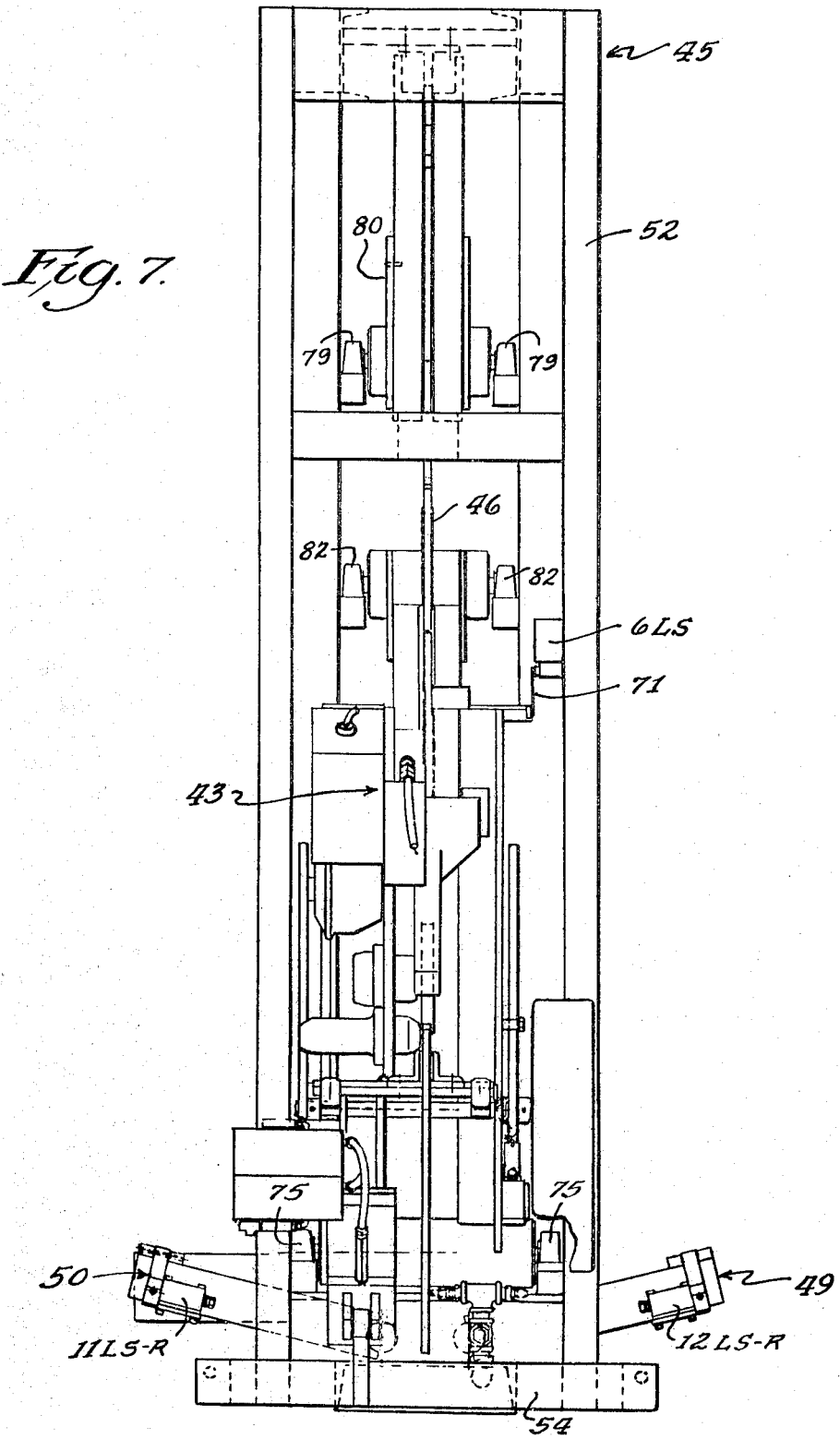
FIGURE 7 is a right side elevational view taken on FIGURE 6.

A set of pillow block bearings 75 (FIGURES 6 and 7) are mounted in fore and aft spaced relation on the floating frame adjacent the lower right-hand corner as viewed in FIGURE 6 to mount a generally upwardly extending support plate structure 76 that carries the strapping head 43 for pivotal swinging movement about the axis 75A. An air cylinder 77 is shown having one end pivoted to lower right-hand corner structure 78 on the floating frame and having its other end pivotally connected to the support plate structure 76 for effecting pivotal swinging movement of the strapping head 43 from its retracted position towards the periphery of a roll located in the floating frame.

A set of pillow block bearings 79 are mounted in fore and aft spaced relation on the floating frame adjacent the upper left-hand corner region of FIGURE 6, and carry a generally horizontally extending support plate structure 80 which is connected to the upper band guide 47 to control pivotal swinging movement of the upper band guide. An air cylinder 81 for actuating the upper band guide 47 has its upper end pivotally connected to the floating frame and its lower end pivotally connected to the support plate structure 80.

A similar set of pillow block bearings 82 and a generally downwardly extending support plate structure 83 are provided along the left-hand side of the floating frame as viewed in FIGURE 6 and the support plate structure is connected to the lower band guide 48 and is driven by an air cylinder 84 which has its lower end pivotally mounted on a side bracket 85 of the support frame structure and has its upper end pivotally connected to a transverse arm extension 83T of the plate structure 83. Individual air cylinders 86 and 87 are also provided for positioning the locator devices 49 and 50, respectively, and as shown in FIGURES 3 and 4, these cylinders have one end conected to the floating frame 45 and the other end connected to a radial connector arm 68C provided on shaft 68.

For simplicity, the wiring diagram as disclosed herein shows the relay contacts separately of the relay coils and to aid in locating the contacts as well as other elements, the wiring is laid out in horizontal lines which are numbered along the left-hand side of the diagram of FIGURE 9. Reference to the contacts which are operated by a particular relay incorporates the line at which the contact appears, thus, for relay 4CR the contact in line 5 of the diagram is designated 4CR-5.

A number of the controls which appear in the diagram are physically situated in strapping head, and are responsive to certain functional elements contained with the head 43. These include limit switch 1LS located at line 26 of the diagram and closed by the seal feed solenoid plunger when a seal is fed; limit switch 2LS at line 24 of the diagram and operated by the sealer assembly when in retracted position and the seal feed hinge is latched; switch 3LS at line 27 and actuated by dog penetration through the eccentric at full tension; switch 4LS at line 30 and actuated by the band re-entering the head upon completion of feed; time delay relay 1TR at line 29 and responsive upon energization to control its contact 1TR-30; time delay relay 3TR at line 26 and responsive upon energization to control contacts 3TR-25, 3TR-26 and 3TR-27; and finally, a double-pole double-throw control relay 2CR at line 25 and having contacts 2CR-24, 2CR-25 and 2CR-30.

A number of other limit switches, as previously described, are associated with the floating frame of the strapping machine and are controlled in accordance with the position of the various functional elements located on it. Thus, switch 5LS, which is associated with the strapper head 43, has cotnacts 5LS-8, 5LS-29 and 5LS-32 that are held operated while the strapper head is at its returned or retracted position; switch 6LS at line 3 of the diagram is arranged to be operated momentarily by the strapper head 43 as it returns to etacted position; switch 7LS at line 8 is held opeated when the upper band guide 47 is held at its retracted position by its air cylinder 81; switch 8LS is held operated when the lower band guide is held at its retracted position by its air cylinder 84; switch 9LS is held operated when the downstream locator device 49 is held at its lower retracted position by its actuating cylinder 86; and switch 10LS is held operated when the upstream locator device 50 is held at its lower retracted position by its actuating cylinder 87.

The downstream locator device 49 has its roll contact limit switches 12LS-L and 12LS-R connected in series in line 23 and the upstream locator device 50 has its roll contact limit switches 11LS-L and 11LS-R connected in series in line 22 of the diagram. Additional control switches associated with the locator devices are limit switch 14LS located at line 17 and operated when the downstream locator device 49 is up, and limit switch 15LS located at line 18 and operated when the upstream locator device 50 is up. Finally, a limit switch 16LS has contacts appearing at lines 23 and 33 of the diagram, and is operated when the strapping head 43 contacts the paper roll.

Electric eyes oriented transversely of the conveyor paths are arranged to sense the presence or absence of a roll. Electric eyes E1 and E2 and their light sources are mounted on the floating frame at a location immediately upstream of the center line of the band guide track 46 of the floating frame, for example, 2 inches upstream, whereas electric eye E3 is located approximately 8 inches downstream of the strap center line. Electric eye E1 and E3 are both dark-operated, whereas, electric eye E2 is light-operated.

Before considering the detailed operation of the control circuit, its general control function with respect to the various air cylinders is first described with reference to FIGURE 10. It may be seen that the air cylinder 87 for actuating the upstream locator device 50 is controlled by a valve 90 which is actuated from solenoid SOL-3 shown at line 20 of the wiring diagram. Similarly, the air cylinder 86 for actuating the downstream locator device 49 is controlled by a valve 91 actuated by solenoid SOL-1 which is shown at line 20 of the diagram; the floating frame cylinder 65 is controlled by a valve 92 which is actuated by solenoid SOL-2 shown at line 18 of the diagram; the air cylinder 77 for the strapping head is controlled by valves 93 and 94 which are actuated by solenoids SOL-5 for head forward movement and SOL-4 for head return movement, with solenoid SOL-5 being shown at line 33 of the diagram, and solenoid SOL-4 at line 32; and finally, the upper and lower band guide cylinders 81 and 84, respectively, are controlled by a valve 95 which is actuated by solenoid 6 shown at line 34 of the diagram.

The strapping head 43 which has its principal control elements incorporated in the diagrams of FIGURES 9 and 10 includes a sealer solenoid 97 which appears at line 27 of the diagram, a feed and holding jaw solenoid 98 which appears at line 31 of the diagram, and a tension and holding jaw solenoid 99 which appears at line 24 of the diagram.

Power is applied to the control circuit shown in the wiring diagram of FIGURE 9 through an on-off switch 1SS (line 1). Assuming the strapping head is ready, a band will be in the track 46, holding switch 4LS open, a seal will have been fed, and the sealer will be retracted so that switch 2LS is released and switch 1LS is held.

Assuming the entire strapping machine is ready, the strapping head 43 is retracted, the band guide arms 47 and 48 are retracted, the locator devices 49 and 50 are down, with these elements holding each of limit switches 5LS, 7LS, 8LS, 9LS and 10LS operated to energize a conveyor circuit control relay 11CR and close its contact 11CR–7 to prepare a circuit to the main conveyor drive motor control relay 9CR.

At this point, the main power switch 1SS is turned on and the air cylinder 77 for controlling the floating frame operates to hold the floating frame 45 towards its downstream position. Also, at this point the electric eye photocell relay E1, which is dark-operated, will be de-energized, whereas the electric eye photocell relay E2 which is light-operated will be energized, and through its contact E2–14 completes a circuit to pick up relay 6TR which has a contact 6TR–6 that prepares a circuit path to relay 4CR.

To start the conveyors for initiating an automatic roll strapping cycle, pushbutton 2PB establishes a circuit to pick up relay 4CR which is then held by a path completed through its contact 4CR–5, contact E1–5 and contact 6TR–6. This same hold contact 4CR–5 completes a path to pick up the conveyor drive motor control relay 9CR.

As the first paper roll is advanced along the supply section 41 of the conveyor, it interrupts the monitoring beams for photocell relays E1 and E2 when it is approximately 2 inches from the center line of the guide track 46. The contact E1–5 then opens to release relay 4CR which then drops relay 9CR to turn off the conveyor drive. The conveyors 41 and 42 stop and maintain the end of the roll within a maximum range of 2 inches while the action of the floating frame 45 is depended upon in compensating for variations in the position of the end face of the roll, and for compensating for any misalignment or angling of the axis of the paper roll with respect to the conveyor travel path.

The de-energization of electric eye relay E1 also closes contact E1–13 to pick up relay 5TR which has a contact 5TR–6 bridged across the contact E1–5 in the holding circuit of relay 4CR. Relay 5TR controls a second contact 5TR–16 to energize solenoid SOL–1 which, as shown in the pneumatic diagram, controls the supply of air to the actuating cylinder 86 for the downstream locator device 49 to raise the downstream locator arms to their extended position where they may sense the position of the forward end face of the roll. This raising of the downstream locator device 49 operates switch 14LS to complete a circuit path at line 17 of FIGURE 9 for energizing relay 7CR and also for energizing solenoid SOL–2. Relay 7CR has a hold contact 7CR–18 and solenoid SOL–2 actuates the air cylinder 65 to move the floating frame 45 upstream towards the forward end face of the paper roll.

The floating frame 45 moves upstream until both arms of its downstream locator device 49 establish contact with the paper roll and cause both limit switches 11LS–L and 11LS–R to close and complete an energizing path for picking up relay 8TR at line 22. In view of the short distance involved, this movement of the floating frame is predominantly linear in the endwise direction of conveyor travel, but may also include limited tilting action as afforded by the suspension system. In any event, the floating frame finally assumes a square relationship relative to the axis of the paper roll which usually will be slightly angled with respect to the conveyor travel path.

Once the engagement of the downstream locator device 49 establishes the proper positional relationship of the floating frame to the paper roll, the energizing of relay 8TR initiates the strapping cycle. Thus, contact 8TR–27 closes to complete a path to the solenoid SOL–5 for moving the strapping head 43 forward and concurrently completes a path to solenoid SOL–6 for moving the upper and lower band guides in. The circuit includes another contact 8TR–27A which operates at a sufficiently delayed time to allow the strapping cycle to be completed without interruption. The strapping head 43 moves forward until its sensing switch 16LS contacts the roll to de-energize solenoid SOL–5 at line 33 and concurrently, to energize the tension and holding jaw solenoid 99 at line 24. The strapping head 43 now performs the strap take-up and tensioning until switch 3LS operates to complete a path for picking up timing relay 3TR at line 26 which has timing contacts 3TR–27 to pick up the sealer solenoid 97 at line 27 and operate the sealing mechanism of the strapping head until sensing switch 2LS de-energizes relay 2CR, solenoid 99 and the sealer solenoid 97. Correspondingly, sense switch 2LS through its contact 2LS–29 energizes the head return solenoid SOL–4 at line 32. In addition, the de-energization of relay 2CR opens its contact 2CR–25 to de-energize the band guide solenoid SOL–6.

As the strapping head 43 returns to retracted position, switch 6LS is operated momentarily to again energize relay 4CR which locks in. The contacts 4CR–16 operate to de-energize solenoid SOL–1 and retract the downstream locator device to release switches 15LS, 11LS–R and 11LS–L. As the downstream locator device is lowered, the floating frame 45 completes its upstream movement by the action of the cylinder 77.

When all the strapping elements are retracted and the limit switches in line 8 are closed, the circuit path to conveyor control relay 11CR is again completed to pick up relay 11CR and close its contact 11CR–7 for energizing the conveyor drive motor relay 9CR and re-starting the conveyors 41 and 42 to move the paper roll downstream. During the first few inches of this movement the forward end of the paper roll intercepts the electric eye beam and actuates the downstream located dark-operated electric eye relay E3.

The paper roll continues its movement until its trailing end face uncovers the beams associated with the electric eye relays E1 and E2. Thus, electric eye relay E1 is de-energized and its contact E1–13 de-energizes relay 5TR. Concurrently, electric eye relay E2 is energized and its contact E2–5 opens to de-energize relay 4CR and through its contact 4CR–5 to de-energize the conveyor drive motor relay 9CR and stop the conveyors. The paper roll is brought to a stop with its trailing end face within a prescribed range of the center line of the floating frame, and exact registry of the floating frame is now effected by moving the floating frame in relation to the now-stationary roll. In this connection contacts E2–14 complete a circuit to pick up relay 6TR which has a contact 6TR–20 to complete a circuit for energizing solenoid SOL–3 to operate the air cylinder 87 that raises the upstream locator device 50.

As the upstream locator device 50 is raised switch 15LS is actuated by engagement with the stub lever 68B that rotates with the shaft 68 of locator 50. Thus, switch 15LS is connected in line 18 and it opens to de-energize relay 7CR and open its hold contact 7CR–18. Switch 15LS also serves to de-energize the floating frame control solenoid SOL–2 and allow return movement of the floating frame 45 towards its initial downstream position. The frame advances downstream and tilts as necessary until both arms of locator device 50 contact the trailing end face of the roll and actuate switches 11LS–R and 11LS–L to pick up relay 8TR at line 22. As described previously, relay 8TR energizes the appropriate circuit elements for moving the strapping head 43 forward, moving the band guides 47 and 48, effecting the take-up and tensioning of the strap, sealing the strap ends, and thereafter returning all of these elements to re-establish the circuit path of line 8 to the conveyor control relay 11CR. The conveyors 41 and 42 re-start and continue until the next paper roll interrupts the light beams associated with electric eye relays E1 and E2. The cycle repeats for each successive paper roll.

Although only a single embodiment of the invention has been shown and described, it should be clearly understood that the invention can be made in other ways without departing from the true scope of the invention as herein claimed.

What is claimed is:

1. Strapping station apparatus for an object that is to receive a band thereabout, said apparatus having support means mounting a movable frame that is to receive the object therewithin, said frame being equipped with strap applying and securing facilities operable, upon being energized, to apply and secure a band about the object disposed therein, object end locator means mounted to move with said frame and responsive when the frame reaches a predetermined relation to one end of the object to maintain such relation, and means operable to energize said facilities when said predetermined relation exists between said object and said frame.

2. Strapping station apparatus for an object that is to receive a band thereabout, said apparatus having support means mounting a movable frame that is to receive the object therewithin, said frame being equipped with strap applying and securing facilities operable, upon being energized, to apply and secure a band about the object disposed therein, means for moving the frame endwise relative to the object, object end locator means mounted to move with said frame and mechanically engageable with one end of the object to stop the frame when the frame reaches a predetermined position about the object, and means operable to energize said facilities when said predetermined position exists between said object and said frame.

3. Strapping station apparatus in accordance with claim 1 and wherein said support means includes at each side of said frame a set of fore and aft spaced vertical links having upper rod ends carried in universally swivelled relation from stationary structure and having lower rod ends joined in universally swivelled supporting relation to fore and aft spaced lower regions of said frame, and actuator means engageable with a lower region of said frame to urge the same endwise toward the object.

4. In combination, a strapping station comprising stationary support structure, a strapping machine having a floating frame mounted from said support structure in relatively movable relation and strap applying and securing facilities carried on said frame and operable, upon being energized, to apply and secure a band under tension about an object disposed therein, means for moving the frame generally endwise relative to the object when the object is at said station, a retractable and extendible locator device carried on said frame and operable when extended to engage endwise with the object disposed at said station to establish a predetermined relation of the frame about the object, and means to energize said facilities when said locator device is extended and said predetermined relation exists between said object and said frame.

5. In combination, a strapping station comprising stationary support structure, a strapping machine having a floating frame mounted from said support structure in relatively movable relation, said support structure including at each side of said frame a set of fore and aft spaced vertical links having upper rod ends carried in universally swivelled relation from stationary structure and having lower rod ends joined in universally swivelled supporting relation to fore and aft spaced lower regions of said frame, and strap applying and securing facilities carried on said frame and operable, upon being energized, to apply and secure a band under tension about an object disposed therein, means engageable with said frame for moving the frame generally endwise relative to the object when the object is at said station, a retractable and extendible locator device carried on said frame and operable when extended to engage endwise with the object disposed at said station to establish a predetermined relation of the frame about the object, and means to energize said facilities when said locator device is extended and said predetermined relation exists between said object and said frame.

6. In apparatus for strapping of objects, said apparatus including a strapping station, and means for advancing an object endwise up to said station for the reception of a band thereabout and thereafter to advance the object endwise through said station, in combination, support means at said station mounting a movable frame equipped with strap applying and securing facilities operable, upon being energized, to apply and secure a band about the object disposed therein, a retractable and extendable locator device carried on said frame and operable in response to approach of the object to move to extended position to engage endwise with the object to establish a predetermined relation of the frame about the object, means for moving the frame endwise relative to the object when the object is at said station, and means actuated by said locator device when at extended position and operable to energize said facilities when said predetermined relation is established between said object and said frame.

7. An apparatus for strapping of objects, said apparatus including a strapping station, and means for advancing an object endwise up to said station for the reception of a band thereabout and thereafter to advance the object endwise through said station, in combination, support means at said station mounting a movable frame equipped with strap applying and securing facilities operable, upon being energized, to apply and secure a band about a roll disposed therein, a retractable and extendible locator device carried downstream on said frame and operable in response to approach of a forward end of the object to move to extended position to engage endwise upstream with the object to establish a predetermined relation of the frame about the forward end of the object, a retractable and extendible locator device carried upstream on said frame and operable in response to approach of a trailing end of an object to move to extended position to engage endwise downstream with the object to establish a predetermined relation of the frame about the trailing end of the object, means engageable with said frame for moving the frame endwise toward the object end that is at said station, and means to energize said facilities each time when said predetermined relation is established between an end of said object and said frame.

8. An apparatus for strapping of objects, said apparatus including a strapping station, and means for advancing an object endwise up to said station for the reception of a band thereabout and thereafter to advance the object endwise through said station, in combination, support means at said station mounting a movable frame equipped with strap applying and securing facilities operable, upon being energized, to apply and secure a band about the object disposed therein, said support means including at each side of said frame a set of fore and aft spaced vertical links having upper rod ends carried in universally swivelled relation from stationary structure and having lower rod ends joined in universally swivelled supporting relation to fore and aft spaced lower regions of said frame, a retractable and extendible locator device carried downstream on said frame and operable in response to approach of a forward end of the object to move to extended position to engage endwise upstream with the object to establish a predetermined relation of the frame about the forward end of the object, a retractable and extendible locator device carried upstream on said frame and operable in response to approach of a trailing end of the object to move to extended position to engage endwise downstream with the object to establish a predetermined relation of the frame about the trailing end of the object, means engageable with a lower region of said frame for moving the frame endwise toward the object end that is at said station, and means to energize said facilities each time when said predetermined relation is established between and end of said object and said frame.

9. In combinaion, a strapping station comprising stationary support structure, and a strapping machine having a floating frame mounted from said support structure in relatively movable relation and strap applying and securing facilities carried on said frame and operable, upon being energized, to apply and secure a band under tension about an object disposed therein, a power driven conveyor section at the upstream side of said strapping station for endwise transport of the object into said station for reception of a band about the object, means for moving the frame upstream when the forward end of the object is stopped at said station, a retractable and extendible locator device carried on said frame at the downstream side of said station and movable to extended position in response to approach of the forward end of the object to said station to engage endwise with the forward end of the object, upon upstream movement of the frame, and establish a predetermined relation of the frame to the object end, control means actuated in response to engagement of the locator device against the object end to effect energization of said strap applying and securing facilities, and another conveyor section at the side of the strapping machine operable in conjunction with the first named conveyor section to advance the object after application of a band on its forward end.

10. In combination, a strapping station comprising stationary support structure, and a strapping machine having a floating frame moutned from said support structure in relatively movable relation and strap applying and securing facilities carried on said frame and operable, upon being energized, to apply and secure a band under tension about an object disposed therein, a power driven conveyor section at the upstream side of said strapping station for endwise transport of the object into said station for reception of a band about the object, means for moving the frame upstream when the forward end of the object is stopped at said station and downstream when the trailing end of the object is stopped at said station, a retractable and extendible locator device carried on said frame at the downstream side of said station and movable to extended position in response to approach of the forward end of the object to said station to engage endwise with the forward end of the object, upon upstream movement of the frame, and establish a predetermined relation of the frame to the forward object end, a retractable and extendible locator device carried on said frame at the upstream side of said station and movable to extended position in response to approach of the trailing end of the object to said station to engage endwise with the trailing end of the object, upon downstream movement of the frame, and establish a predetermined relation of the frame to the trailing object end, control means actuated in response to engagement of either locator device against the corresponding object end to effect energization of said strap applying and securing facilities, and another conveyor section at the downstream side of the strapping machine operable in conjunction with the first named conveyor section to advance the object after application of a band on its forward end and to again advance the object after application of a band on its trailing end.

11. An arrangement in accordance with claim 10 wherein said support structure includes fore and aft spaced vertical links having upper rod ends carried in universally swivelled relation from stationary structure and having lower rod ends joined in universally swivelled supporting relation to fore and aft spaced lower regions of said frame, and actuator means engageable with a lower region of said frame to urge the same endwise toward the object.

12. In combination, a strapping station comprising stationary support structure, and a strapping machine having a floating frame mounted from said support structure in relatively movable relation and strap applying and securing facilities carried on said frame and operable, upon being energized, to apply and secure a band under tension about an object disposed therein, a power driven conveyor section at the upstream side of said strapping station for endwise transport of the object into said station for reception of a band about the object, means for moving the frame upstream when the forward end of the object is stopped at said station and downstream when the trailing end of the object is stopped at said station, object end locator means carried on said frame and responsive to the forward end of the object, upon upstream movement of the frame, to control said frame to establish a predetermined relation of the frame to the forward object end, and responsive to the trailing end of the object, upon downstream movement of the frame, to control said frame to establish a predetermined relation of the frame to the trailing object end, control means actuated in response to engagement of the object end locator means against either object end to effect energization of said strap applying and securing facilities, and another conveyor section at the downstream side of the strapping machine operable in conjunction with the first named conveyor section to advance the object after application of a band on its forward end and to again advance the object after application of a band on its trailing end.

13. In combination, a strapping station, a supply conveyor for transporting an object endwise into said station for reception of a band about its forward end, a discharge conveyor aligned with the supply conveyor to receive the object and transport the object endwise through said station after receiving a band about its forward end, said strapping station comprising stationary support structure at a location intermediate of said conveyors and a strapping machine having a floating frame mounted from said support structure to move in either direction along the object travel path and having strap applying and securing facilities carried on said frame and operable, upon being energized, to apply and secure a band about an object disposed therein, independently operable object end locator devices carried on the frame at the upstream and downstream sides thereof, each locator device normally being retracted and being extendible individually to a position intercepting the object travel path, means operable incident to approach of the forward end of the object to said station for stopping the conveyors, for extending the locator device on the downstream side of the frame, and for moving the frame upstream until the locator device engages the forward end of the object and establishes the frame in a predetermined relation about the forward end of the object, means to energize said facilities when said predetermined relation is established for effecting application of a band about the forward end of the object, means operable incident to completing application of the band on the forward end to retract the downstream side locator device and to start the conveyors for advancing the object through the frame, means operable by the object incident to approach of the trailing end to said station for stopping the conveyors, for extending the locator device on the upstream side of the frame, and for moving the frame downstream until the locator device engages the trailing end of the object and establishes the frame in a predetermined relation about the trailing end of the object, means to energize said facilities when the last named predetermined relation is established for effecting application of a band about the trailing end of the object, means operable incident to completing application of the band on the trailing end to retract the upstream side locator device and to start the conveyors for advancing the object beyond the frame.

14. In strapping apparatus that includes a strapping station, a supply conveyor for transporting an object endwise into said station for reception of a band about its lead end, and a discharge conveyor aligned with the supply conveyor to receive the object and transport the object endwise through said station after receiving a band about its forward end, the improvement wherein said strapping station comprises stationary support structure transversely spaced sets of fore and aft spaced swivel mounted suspension links at a location intermediate of said conveyors and a strapping machine having a floating frame having lower side regions in swivelled connection to the links of said support structure to move in either direction along the object travel path and having strap applying and securing facilities carried on said frame and operable, upon being energized, to apply and secure a band about the object disposed therein, independently operable object end locator devices carried on the frame at the upstream and downstream sides thereof, each locator device normally being retracted and being extendible individually to a position intercepting the object travel path, each locator device having a pair of aligned radius arms for establishing a square relation of the frame to the object when both arms are in contact therewith, means operable incident to approach of the forward end of the object to said station for stopping the conveyors, for extending the locator device on the downstream side of the frame, and for moving the frame upstream until both arms of the corresponding locator device engage the forward end of the object and establish the frame in a predetermined square relation about the forward end of the object, means to energize said facilities when said predetermined relation is established for effecting application of a band about the forward end of the object, means operable incident to completing application of the band on the forward end to retract the downstream side locator device and to start the conveyors for advancing the object through the frame, means operable by the object incident to approach of the trailing end to said station for stopping the conveyors, for extending the locator device on the upstream side of the frame, and for moving the frame downstream until both arms of the corresponding locator device engage the trailing end of the object and establish the frame in a predetermined square relation about the trailing end of the object, means to energize said facilities when the last named predetermined relation is established for effecting appliction of a band about the trailing end of the object, means operable incident to completing application of the band on the trailing end to retract the upstream side locator device and to start the conveyors for advancing the object beyond the frame.

References Cited by the Examiner

UNITED STATES PATENTS

| | | | |
|---|---|---|---|
| 2,818,795 | 1/1958 | Gustafson | 100—4 |
| 2,908,215 | 10/1959 | Fawcett | 100—26 |
| 3,019,577 | 2/1962 | Slamar et al. | 53—198 X |
| 3,120,171 | 2/1964 | Hall et al. | 100—26 |
| 3,179,037 | 4/1965 | Cranston et al. | 100—26 X |
| 3,213,780 | 10/1965 | Neitzel et al. | 100—26 X |
| 3,220,337 | 11/1965 | Goland et al. | 100—26 X |
| 3,225,683 | 12/1965 | Rhea | 100—26 X |

WALTER A. SCHEEL, *Primary Examiner.*

B. J. WILHITE, *Assistant Examiner.*